Patented Jan. 4, 1944

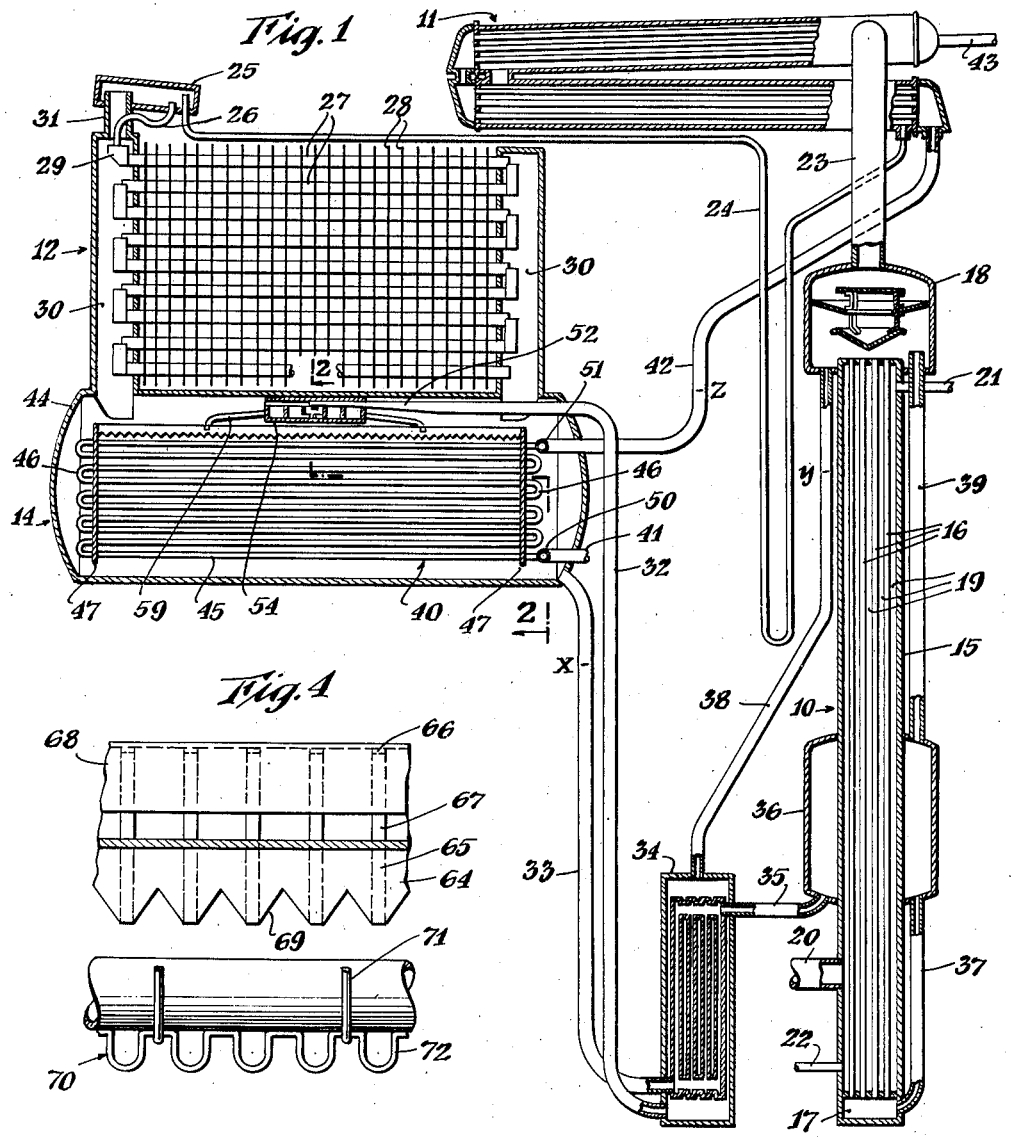
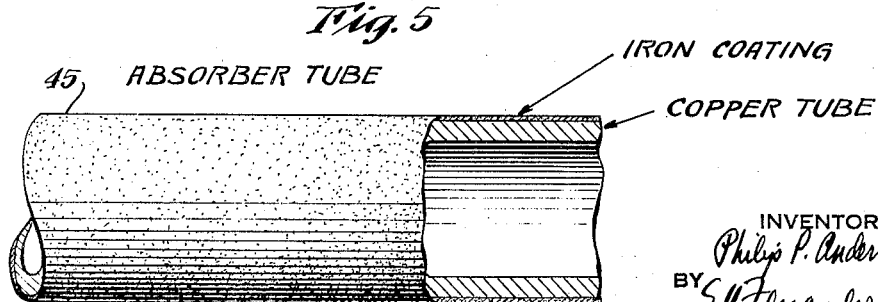

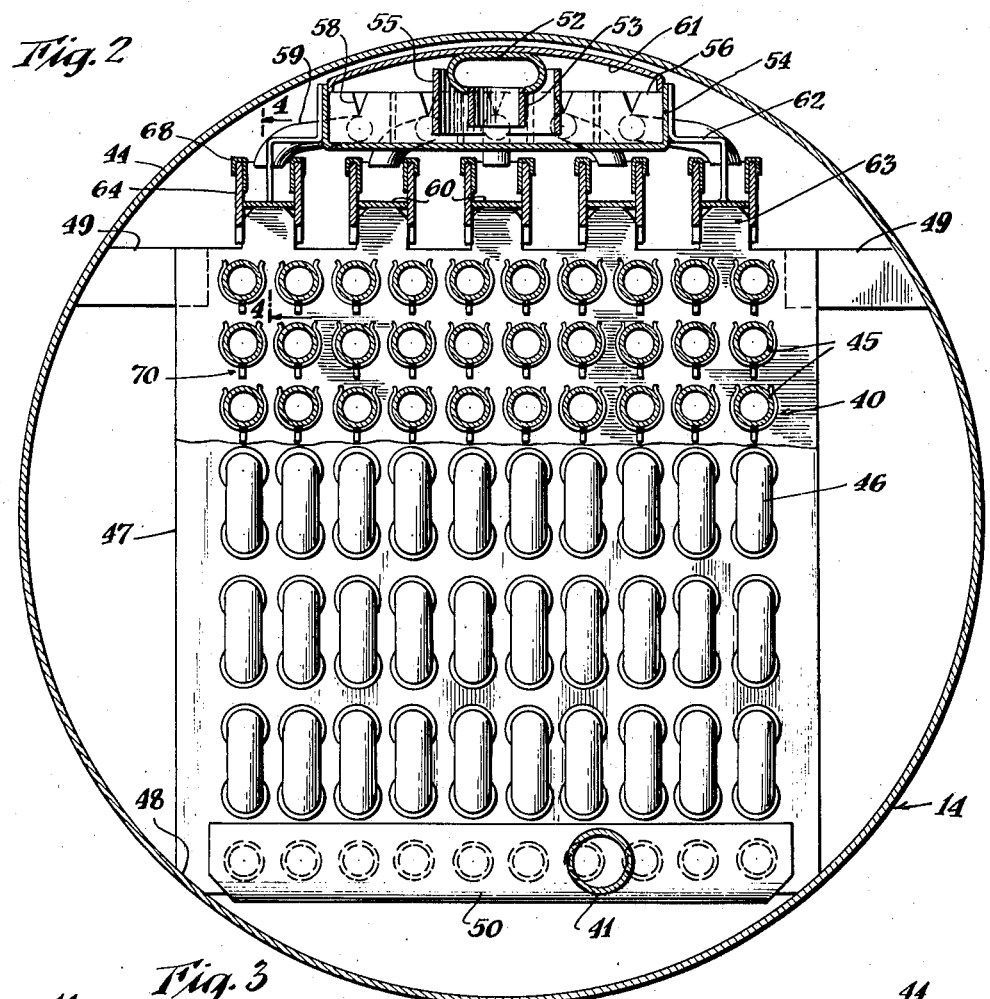
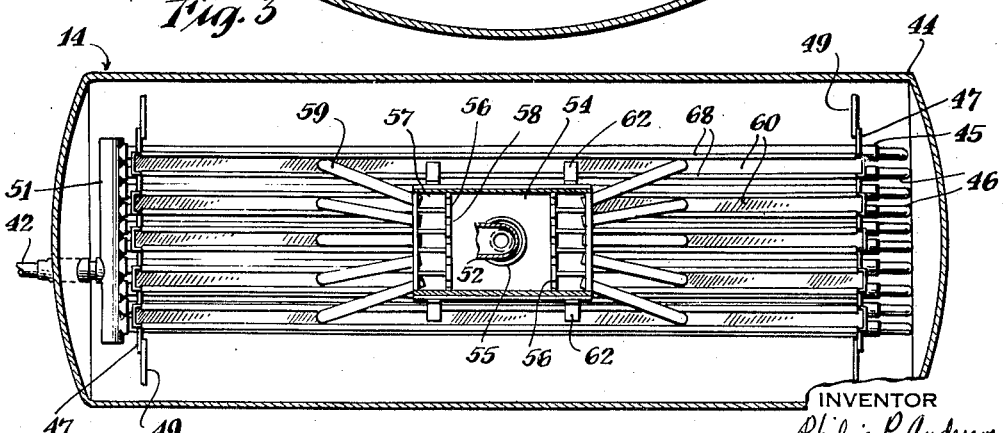

2,338,223

UNITED STATES PATENT OFFICE 2,338,223

REFRIGERATION

Philip P. Anderson, Jr., Evansville, Ind., assignor to Servel, Inc., New York, N. Y., a corporation of Delaware Application April 15, 1941, Serial No. 388,568

13 Claims. (Cl. 62—119)

My invention relates to refrigeration, and more particularly to absorbers of absorption-type refrigeration systems.

In absorbers of the so-called "film" type a film of absorption liquid is caused to form on the surfaces of piping through which a cooling medium flows. While flowing over the pipe surfaces the absorption liquid absorbs refrigerant vapor passing into the absorber, and the resulting heat of absorption is transferred to the cooling medium, such as water, which flows inside the piping.

In order to provide ample gas and liquid contact surface for the refrigerant vapor and absorption liquid, it is desirable to provide piping having an exterior surface possessing such physical properties that the film of absorption liquid will be readily produced and maintained over the entire peripheral surface of the piping. The ability of the absorption liquid to spread and form a liquid film on the piping is of considerable importance because this is one factor which determines the size of an absorber for a refrigeration system of a given capacity. In refrigeration systems of large capacity increasing the size of the absorber usually results in increasing the size of the system with which the absorber is associated, and this is objectionable because it is desirable to keep refrigeration systems as small as possible so that they will occupy a minimum amount of space.

In refrigeration systems in which water is employed as the cooling medium to which heat of absorption is given up in the absorber, it is desirable to employ piping formed of copper so that corrosion difficulties usually encountered in iron or steel piping are avoided. In absorbers in which piping formed of copper is employed it has been found that this metal possesses such physical properties that spreading of absorption liquid on the exterior of the piping to produce a liquid film is not promoted to the fullest extent possible. This is especially true when a water solution of a lithium salt is employed as an absorbent, such as, for example, water solution of lithium chloride.

In accordance with my invention, in order to promote spreading of absorption liquid on the exterior of piping to the fullest extent possible and at the same time avoid corrosion when water is utilized as the cooling medium inside the piping, I employ piping having an inner surface formed of copper and an outer surface possessing such physical properties that spreading of absorption liquid is facilitated and promoted whereby a liquid film will be readily produced and maintained on the exterior of the piping. More particularly, I employ copper tubing as the absorber piping and form an iron coating on the exterior surface of the tubing, so that the cooling water will contact copper and the absorption liquid will contact an iron surface. This has been found to be especially advantageous in a system in which an absorbent containing a water solution of lithium chloride is employed because of the affinity of such a solution to spread and readily form a liquid film on an iron surface.

The invention, together with the objects and advantages thereof, will be more fully understood from the following description and accompanying drawings, forming a part of this specification, and of which:

Fig. 1 is a view more or less diagrammatically illustrating an absorption refrigeration system embodying the invention;

Fig. 2 is an enlarged vertical sectional view, taken on line 2—2 of Fig. 1, to illustrate the absorber more clearly;

Fig. 3 is a horizontal plan view of the absorber, with the top of the shell broken away and in section, to illustrate more clearly the manner in which absorption liquid is distributed;

Fig. 4 is an enlarged fragmentary view, taken on line 4—4 of Fig. 2, to illustrate parts of the absorber more clearly; and Fig. 5 is an enlarged fragmentary view diagrammatically illustrating the absorber tubing.

Referring to Fig. 1 my invention is embodied in a two-pressure absorption refrigeration system like that described in application Serial No. 239,762 of A. R. Thomas and P. P. Anderson, Jr., filed November 10, 1938. A system of this type operates at low pressures and includes a generator or vapor expeller 10, a condenser 11, an evaporator 12, and an absorber 14 which are interconnected in such a manner that the pressure differential in the system is maintained by liquid columns.

The disclosure in the aforementioned Thomas and Anderson application may be considered as being incorporated in this application, and, if desired, reference may be had thereto for a detailed description of the refrigeration system. In Fig. 1 the generator 10 includes an outer shell 15 within which are disposed a plurality of vertical riser tubes 16 having the lower ends thereof communicating with a space 17 and the upper ends thereof extending into and above the bottom of a vessel 18. The space 19 within shell 15 forms a steam chamber about the tubes 16 to which steam is supplied through a conduit 20. The space 19 provides for full length heating of tubes 16, a vent 21 being formed at the upper end of shell 15. A conduit 22 is connected to the lower part of shell 15 for draining condensate from space 19.

The system operates at a partial vacuum and contains a water solution of refrigerant in absorbent liquid, such as, for example, a water solution of about 40% lithium chloride by weight. With steam being supplied through conduit 20 to space 19 at atmospheric pressure, heat is applied to tubes 16 whereby water vapor is expelled from solution. The absorption liquid is raised by gas or vapor-lift action with the expelled water vapor forming a central core within an upwardly rising annulus of the liquid. The expelled water vapor rises more rapidly than the liquid with the liquid following along the inside walls of tubes 16.

The water vapor flows upwardly through the tubes or risers 16 into vessel 18 which serves as a vapor separator. Due to baffling in vessel 18, water vapor is separated from raised absorption solution and flows through conduit 23 into condenser 11. The condensate formed in condenser 11 flows through a U-tube 24 into a flash chamber 25 and from the latter through a conduit 26 into evaporator 12.

The evaporator 12 includes a plurality of horizontal banks of tubes 27 disposed one above the other and to which are secured heat transfer fins 28 to provide a relatively extensive heat transfer surface. The liquid flowing to evaporator 12 is divided in any suitable manner for flow through the uppermost banks of tubes 27. The dividing of liquid may be effected by providing a liquid distributing trough 29 into which the liquid flows through the conduit 26. The water passes through successively lower banks of tubes through suitable end connections which are open to permit escape of vapor from the tubes, and any excess liquid is discharged from the lowermost bank of tubes 27.

The water supplied to tubes 27 evaporates therein to produce a refrigerating or cooling effect with consequent absorption of heat from the surroundings, as from a stream of air flowing over the exterior surfaces of the tubes 27 and fins 28. The vapor formed in tubes 28 passes out into end headers 30 which are connected at their lower ends to absorber 14. The flash chamber 25 is provided to take care of any vapor flashing of liquid being fed to evaporator 12 through U-tube 24. The flashed vapor formed in the initial cooling of the liquid flowing from condenser 11 passes through a conduit 31 into one of the headers 30 and mixes with vapor formed in the evaporator 12, so that disturbances in the evaporator due to vapor flashing are avoided.

In absorber 14 refrigerant vapor is absorbed into concentrated absorption liquid which enters through a conduit 32, as will be described presently. The diluted absorption liquid flows through a conduit 33, a first passage in liquid heat exchanger 34, conduit 35, vessel 36 and conduit 37 into the lower space 17 of generator 10. Water vapor is expelled out of solution in generator 10 by heating, and the solution is raised by gas or vapor-lift action in riser tubes 16, as explained above.

The absorption liquid in vessel 18 is concentrated since water vapor has been expelled therefrom in generator 10. This concentrated absorption liquid flows through a conduit 38, a second passage in liquid heat exchanger 34, and conduit 32 into the upper part of absorber 14. This circulation of absorption liquid results from the raising of liquid by vapor-lift action in vertical riser tubes 16, whereby the liquid can flow to absorber 14 and return from the latter to the generator 10 by force of gravity. The upper part of vessel 36 is connected by a conduit 39 to vessel 18, so that the pressure in vessel 36 is equalized with the pressure in the upper part of generator 10 and condenser 11.

The heat liberated with absorption of water vapor in absorber 14 is transferred to a cooling medium, such as water, for example, which flows upward through the vertically disposed piping 40. The cooling medium enters the lower end of the piping 40 through a conduit 41 and leaves the upper end of the piping 40 through a conduit 42. The conduit 42 is connected to condenser 11 whereby the same cooling medium may be utilized to cool both condenser 11 and absorber 14, and from condenser 11 the cooling medium flows through a conduit 43 to waste.

The system operates at low pressures with the generator 10 and condenser 11 operating at one pressure and the evaporator 12 and absorber 14 operating at a lower pressure, the pressure differential therebetween being maintained by liquid columns. Thus, the liquid column formed in tube 24 maintains the pressure differential between condenser 11 and evaporator 12, the liquid column in conduit 33 maintains the pressure differential between the outlet of absorber 14 and generator 10, and the liquid column formed in conduit 32 and connected parts including conduit 38 maintains the pressure differential between the inlet of the absorber and the upper part of generator 10. In operation, the liquid columns may form in conduits 33, 38, 42 and down-leg of tube 24 to the levels $x$, $y$ and $z$, for example. The conduits are of such size that restriction to gas flow is effected without appreciably restricting flow of liquid.

The liquid column formed in vessel 36 and conduit 37 provides the liquid reaction head for raising liquid in riser tubes 16 by vapor-lift action. The vessel 36 is of sufficient volume to hold the liquid differential in the system and is of such cross-sectional area that the liquid level therein does not appreciably vary, so that a substantially constant reaction head is provided for lifting liquid in generator 10.

The absorber 14 is like that described in application Serial No. 350,234 of A. R. Thomas and P. P. Anderson, Jr., filed August 3, 1940. As shown, the absorber 14 includes a cylindrical shell 44 to which is secured the lower ends of evaporator headers 30, so that vapor formed in evaporator 12 will pass through the headers into the shell 44. Within shell 44 is the piping 40 formed to provide a plurality of vertical pipe banks arranged alongside of each other. Each pipe bank includes a plurality of substantially horizontal copper tubes 45 located one above the other and connected by bends 46. The ends of tubes 45 pass through and are secured at openings in end plates 47. The bottom corners of the end plates 47 are welded at 48 to the bottom parts of shell 44, and the top corners thereof are secured by brackets 49 to the upper parts of the shell so that a rigid support is provided for the piping 40.

The ends of the bottom tubes 45 of each pipe bank are connected to a manifold 50, as shown most clearly in Figs. 1 and 2. The top tubes are similarly connected at one end to another horizontal manifold 51, as shown most clearly in Figs. 1 and 3. The conduits 41 and 42 through which cooling water enters and leaves piping 40 pass through end openings in shell 44 and are connected to the manifolds 50 and 51, respectively. The cooling water entering through conduit 41 is distributed laterally in manifold 50 with a portion of the cooling water flowing upwardly through each vertical pipe bank. The several streams of cooling water flowing upwardly through the pipe banks come together in the top manifold and the cooling water then flows through conduit 42 to condenser 11, as explained above.

The conduit 32 through which concentrated absorption liquid is introduced into absorber 14 terminates in a flattened or elliptical portion 52 disposed substantially at the center part of shell 44. The elliptical portion 52 is closed at its end and to an opening in the bottom side thereof is secured a short tubular member 53 through which entering absorption liquid passes into a liquid receptacle 54. An annular member 55 is supported in a raised position in vessel 54 to prevent splashing of liquid entering the latter.

The receptacle 54 is provided with spaced transverse walls 56 to provide smaller end compartments 57 into which liquid flows through V-shaped notches 58 in the walls 56, as shown most clearly in Fig. 2. From the smaller end compartments 57 absorption liquid passes through a plurality of pipes 59 into troughs 60 which are located alongside of each other and extend lengthwise of the shell 44. It will be noted that the pipes 59 lead from directly opposite end compartments 57 at each end of vessel 54, so that absorption liquid will be supplied to the same trough 60 at regions spaced from each other. The vessel 54 is provided with a cover 61 and is supported by suitable brackets 62 to the outermost troughs 60, as shown in Figs. 2 and 3.

The troughs 60 are H-shaped, as best shown in Fig. 2, and are supported at their ends by tabs 63 formed at the top edges of end plates 47. The vertical pipe banks are positioned beneath the side walls 64 of the troughs 60. Liquid is siphoned from the troughs 60 onto the uppermost tubes 45 in such a manner that longitudinal subdivision of absorption liquid is effected. This is accomplished by forming the outer surfaces of the side walls with vertical slots 65 which extend from the top to the bottom edges of the side walls, as shown most clearly in Fig. 4. The slots 65 are in alignment with slots 66 at the top edges of the walls and slots 67 which extend downward from the slots 66 to the bottom of the troughs 60 at the inner surfaces of the walls 64.

The slots 65, 66 and 67 are covered by inverted U-shaped metal plates 68 formed from relatively thin sheet metal. The covering of the slots by the plates 68 form passages through which flow of liquid is effected by capillary siphon action. After the liquid in the troughs 60 reaches the lower edges of the longer side walls of plates 68, flow of liquid is then effected by capillary siphon action. The liquid siphoned from the troughs 60 flows down the outer surfaces of side walls 64 toward teeth 69 formed by notching the lower edges of the walls. In this manner the downwardly flowing film of liquid formed at the outer surfaces of the side walls 64 is caused to flow toward a number of spaced points at which drops of liquid are formed. The teeth 69 are as close together as possible with the spacing being such that lateral bridging of the teeth with liquid is prevented. In this manner drops of liquid formed at the teeth 69 fall in rapid succession onto the top surfaces of the top or highest horizontal tubes 45.

To the bottom portions of all the horizontal tubes 45, except the tubes at the extreme bottom which are connected to manifold 50, are provided metal strips 70 which are secured to the tubes by spring clips 71 and provided with U-shaped loops 72. The U-shaped loops 72 form eyelets or teeth which serve as points at which drops of liquid are formed with the liquid flowing downwardly over the surfaces of the horizontal tubes 45. The loops 72 also are as close together as possible with the spacing being such that lateral bridging of the loops with liquid is prevented. The loops 72 are preferably spaced from the top surface portions of the tubes 45 directly beneath the loops a vertical distance substantially the diameter of a drop of liquid.

While flowing over the outside of the horizontal tubes 45 the absorption liquid absorbs the evaporated water passing into the shell 44 from evaporator 12 through the headers 30. The heat of absorption resulting from absorption of water vapor by the absorption solution is given up to the cooling water which flows inside the tubes 45. The diluted solution flows out from the bottom of shell 44 into conduit 33 in which the liquid stands to a height, such as $x$, for example, which is dependent upon the prevailing pressure differential between the absorber 14 and generator 10.

In a "film" type of absorber of the kind just described it is highly important that the drops of liquid fall in rapid succession along the entire lengths of the trough side walls 64 and the horizontal tubes 45. By insuring that liquid drops are formed at the bottom sides of the tubes 45 a rainfall is simulated with the drops of liquid always flowing onto the top surfaces of all of the tubes including those at the bottom part of the absorber. Any tendency for the liquid drops to run together to produce distinct individual streams of liquid at localized areas, so that the entire peripheral surfaces of the tubes 45 are not completely wetted, is extremely objectionable because this reduces the capacity and ability of the absorber to absorb refrigerant vapor into absorption liquid.

In order to avoid corrosion difficulties when using water as the cooling medium, the horizontal tubes 45 and connecting bends 46 are formed of copper. While employing tubes 45 formed of copper is a distinct advantage in that the cooling water is then contacted by a metal which is highly resistant to corrosion, it has been found that copper possesses such physical properties that spreading of certain absorption solutions on such surfaces is not promoted to the fullest extent possible in an absorber of the character described and illustrated. Among the absorption solutions which do not spread satisfactorily on copper surfaces are the water solutions of lithium salts, such as, for example, a water solution of about 40% lithium chloride by weight. In order to retain the advantage of employing copper tubing to form a passage for the cooling water and also provide a metallic surface which promotes spreading of absorption solution to maintain a satisfactory liquid film on the exterior surface of the absorber piping, the tubes 45 are formed with an exterior iron surface. The copper tubes 45 can readily be provided with an outer layer or coating of iron by electro-plating. The iron surface formed on the exterior of the copper tubes 45 by electro-plating is highly satisfactory, and this is especially so when using water solutions of lithium salts as an absorbent because these solutions have an affinity for the iron, whereby spreading of such solutions is readily effected to produce and maintain liquid films over the entire exterior surfaces of the tubes. By always maintaining the entire peripheral surfaces of all the tubes in a completely wetted state, it will be apparent that the ability of the absorber to absorb refrigerant vapor is not impaired to the slightest extent, so that this factor will be extremely favorable in insuring that the absorber will be of minimum size for a refrigeration system of a given capacity.

By electro-plating an iron coating on the copper tubes 45 so that the layer of iron is integrally united with the metal forming the tube, as diagrammatically illustrated in Fig. 5, a single tube can be employed to provide inner and outer surfaces of copper and iron, respectively, whereby the fabrication of absorbers of the type described is facilitated.

It has been found that the distance between corresponding parts of adjacent loops 72 should be at least ½ inch, so that the drip points will be located as close together as possible without lateral bridging of the space between the loops by absorption solution. With the above spacing of the drip points for aqueous solutions of lithium salts, and particularly lithium chloride solution, the drops of solution falling on to a tube having an exterior copper surface do not spread sufficiently to merge and form a continuous liquid film. However, by employing iron-coated tubes 45 of the character described and illustrated, the absorption solution spreads sufficiently to form a continuous film, so that a desirable correlation of the spacing of the drip points and liquid film formation on the absorber tubes is effected.

While a single embodiment of the invention has been shown and described, it will be apparent that modifications and changes may be made without departing from the spirit and scope of the invention, as pointed out in the following claims.

What is claimed is:

1. In refrigeration apparatus of the absorption type having structure for effecting gas and liquid contact including piping through which a cooking fluid is conducted, said piping comprising substantially horizontal tubes disposed one above the other, means to supply liquid to a region above said tubes, and means for distributing the liquid onto said tubes from said region by causing drops of liquid to fall freely by gravity from fixed points at the bottom side of each tube onto the top side of the succeeding lower tube, whereby the drops of freely falling liquid simulate a rainfall, said tubes having an inner surface of non-ferrous metal highly resistant to corrosion and an outer surface of iron to facilitate spreading of the drops of liquid falling onto the top sides of the tubes, so that the liquid will be distributed on the outer surfaces of said tubes to maintain the latter in a wetted state by films of liquid.

2. In refrigeration apparatus as set forth in claim 1 in which said tubes are formed of copper and said outer surface of iron is formed integrally with the copper tubes.

3. In refrigeration apparatus of the absorption type having an absorber into which are introduced water vapor and an absorbent containing a water solution of a salt of lithium, said absorber comprising a vessel, and piping within said vessel through which a cooling fluid is conducted, said piping comprising substantially horizontal tubes disposed one above the other for effecting gas and liquid contact between said water vapor and said solution, means to supply said solution to a region above said tubes, means for distributing said solution onto said tubes from said region so that drops of liquid freely fall by gravity from fixed points at the bottom side of each tube onto the top side of the succeeding lower tube, said tubes having an inner surface containing metal highly resistant to corrosion and an outer surface containing a metal for which the solution has such an affinity that spreading of the drops of liquid falling onto the top sides of said tubes is facilitated to maintain the latter in a wetted state by films of liquid.

4. In refrigeration apparatus of the absorption type having an absorber, connections for introducing into said absorber water vapor and an absorbent for such vapor containing a water solution of a salt of lithium, said absorber including a vessel into which said absorption solution is introduced for downward flow therein, and a conduit within said vessel upon which the downwardly flowing solution is caused to flow and through which a cooling medium is conducted, said conduit being formed of non-ferrous metal to provide an inner surface highly resistant to corrosion and an outer surface containing a ferrous metal for which said solution has such an affinity that spreading of absorbent on the exterior of said conduit is facilitated to provide a wetted surface at which absorption of said water vapor by said solution is effected.

5. In refrigeration apparatus of the absorption type having structure for effecting gas and liquid contact including piping through which a cooling fluid is conducted, said piping comprising horizontal tubes disposed one above the other, means to supply to a region above said tubes an absorbent containing a water solution of salt lithium, means for distributing the solution onto said tubes from said region by causing drops of liquid to fall freely by gravity from drip points at the bottom side of each tube onto the top side of the tube beneath it, said liquid distributing means being formed and arranged so that the drops of liquid are formed as close together as possible without lateral bridging between the drip points by the solution, said tubes being formed of one metal to provide an inner surface highly resistant to corrosion and an outer surface containing another metal possessing such physical properties that the drops of liquid falling on the top sides of said tubes spread sufficiently to merge and form a continuous liquid film.

6. In refrigeration apparatus of the absorption type having structure for effecting gas and liquid contact including piping through which a cooling fluid is conducted, said piping comprising substantially horizontal tubes disposed one above the other, means to supply to a region above said tubes an absorbent containing an aqueous solution of salt of lithium, means for distributing the solution on to said tubes from said region by causing drops of liquid to fall freely by gravity from drip points at the bottom side of each tube onto the top side of the succeeding lower tube, said liquid distributing means being so formed and arranged that the drip points are spaced approximately one-half inch apart, said tubes being formed of non-ferrous metal to provide inner surfaces highly resistant to corrosion and having outer surfaces containing iron, whereby the solution spreads sufficiently to form a continuous liquid film on said tubes.

7. An absorption refrigeration apparatus including an absorber, means for conducting into said absorber water vapor and an absorbent containing a water solution of a salt of lithium, said absorber comprising a vessel and piping therein through which a cooling fluid is introduced, said piping comprising substantially horizontal tubes disposed one above the other and upon the outer surfaces of which gas and liquid contact is effected between the water vapor and the solution, means to supply the solution to a region above said tubes, means for distributing the solution onto said tubes from said region so that drops of liquid freely fall by gravity from fixed points at the bottom side of each tube onto the top side of the succeeding lower tube, said tubes being formed of copper to provide inner surfaces highly resistant to corrosion, and said copper tubes having outer metallic surface formed integrally therewith and containing a metal for which the solution has such an affinity that spreading of the liquid falling on the top sides of said tubes is facilitated to maintain the latter in a wetted state by films of liquid.

8. An absorption refrigeration apparatus including an absorber, means for conducting into said absorber water vapor and an absorbent containing a water solution of a salt of lithium, said absorber comprising a vessel and piping therein through which a cooling fluid is conducted, said piping comprising substantially horizontal tubes disposed one above the other and upon the outer surfaces of which gas and liquid contact is effected between the water vapor and the solution, means to supply the solution to a region above said tubes, and means for distributing the solution onto said tubes from said region so that drops of liquid freely fall by gravity from fixed points at the bottom side of each tube onto the top side of the succeeding lower tube, said tubes being formed of copper and having outer surfaces containing iron formed thereon by electro-plating, said copper tubes providing inner surfaces highly resistant to corrosion and the solution having such an affinity for the outer electro-plated surfaces of iron that spreading of the drops of liquid falling on the top sides of said tubes is facilitated to maintain the latter in a wetted state by films of liquid.

9. Refrigeration apparatus having a wall through which heat transfer takes place between a film of liquid on one surface of the wall and a fluid contacting the other side of the wall, said wall being made of copper and having a coating of iron on said surface to facilitate formation of said film.

10. Refrigeration apparatus having a wall portion formed by a tube through which heat is transferred from a film of liquid on the outside of said tube to a cooling medium flowing through said tube, said tube comprising a copper pipe having an exterior coating of iron to facilitate formation of said film.

11. Refrigeration apparatus having a wall through which heat is dissipated from a film of liquid on the surface of the wall within the apparatus to a cooling medium contacting the other side of said wall, said wall being made of copper and having a coating of iron formed by electrodeposition on said surface to facilitate formation and maintenance of said film.

12. Absorption type refrigeration apparatus having an absorber wall through which heat is transferred from a film of absorption liquid on one surface of the wall to a cooling medium contacting the opposite side of the wall, said wall being made of copper and having a coating of iron on said surface to facilitate formation of said film.

13. Absorption type refrigeration apparatus having an absorber wall comprising a tube through which heat is transferred from a film of absorbent liquid on the exterior surface of said tube to a cooling fluid flowing in said tube, said tube comprising a copper pipe having an external coating of iron to facilitate formation of said film.

PHILIP P. ANDERSON, Jr.